United States Patent [19]

Lee et al.

[11] Patent Number: 5,946,066
[45] Date of Patent: Aug. 31, 1999

[54] LIQUID CRYSTAL DISPLAY

[75] Inventors: Seung Hee Lee; Hyang Yul Kim, both of Ich'on; Woo Ho Choi, Seoul, all of Rep. of Korea

[73] Assignee: Hyundai Electronics Industries Co., Ltd., Kyoungki-Do, Rep. of Korea

[21] Appl. No.: 09/104,105

[22] Filed: Jun. 25, 1998

[30] Foreign Application Priority Data

Jun. 27, 1997 [KR] Rep. of Korea ............. 97-28458

[51] Int. Cl.⁶ .................... G02F 1/136; G02F 1/1343; G02F 1/139
[52] U.S. Cl. ................. 349/141; 349/42; 349/145; 349/110
[58] Field of Search ................ 349/42, 43, 110, 349/111, 141, 139, 145, 143; 345/87, 92

[56] References Cited

U.S. PATENT DOCUMENTS

| | | | |
|---|---|---|---|
| 5,598,285 | 1/1997 | Kondo et al. | 349/141 |
| 5,657,105 | 8/1997 | McCartney | 349/157 |
| 5,745,207 | 4/1998 | Asada et al. | 349/141 |
| 5,886,762 | 3/1999 | Lee et al. | 349/141 |

*Primary Examiner*—Hung Xuan Dang
*Assistant Examiner*—Tai V. Duong
*Attorney, Agent, or Firm*—Selitto & Associates

[57] ABSTRACT

A liquid crystal display having a lower substrate, a data line bended and formed on the lower substrate, a counter electrode bended in the same direction as the data line and formed on the lower substrate, and a pixel electrode bended in the same direction as the data line and formed on the lower substrate. The pixel electrode has a bar for bisecting a space defined by the counter electrode. The counter electrode is a rectangular frame. Accordingly, an aperture ratio of the liquid crystal display is increased while multi-domain is formed between the pixel electrode and the counter electrode.

3 Claims, 3 Drawing Sheets

LIQUID CRYSTAL DISPLAY

BACKGROUND OF THE INVENTION

1. Field of the Invention

The present invention is related to a liquid crystal display, and more particularly to a technique for improving an aperture ratio of the liquid crystal display.

2. Related Art

The quality of the liquid crystal display(LCD) is judged by some factors such as a contrast ratio which is ratio of brightness at voltage applied to the LCD to that at no applied voltage and a right-left viewing angle. Thus, there has been proposed an in-plane switching(IPS) mode LCD having superior contrast ratio and the right-left viewing angle.

In IPS mode LCD, both a pixel electrode and a counter electrode are formed on a lower substrate and an electric field between the pixel electrode and the counter electrode is parallel to a plane of the lower substrate.

In FIG. 1, the conventional IPS mode LCD is illustrated. A data line 1 is extended in a straight line and a U-shaped pixel electrode 2 is arranged parallel to the data line 1. A counter electrode 3 is an inverse U-shaped and interdigitated with respect to the pixel electrode 2. If voltage is applied, an electric field F1 is formed between the pixel electrode 2 and the counter electrode 3. The liquid crystal molecules are arranged responsive to the electric field F1. Since the length of the liquid crystal molecules in a minor axis is different from that in a major axis, the optical path is different according to the direction of an observer. Therefore, a screen color of the liquid crystal display is changed with respect to the viewing angle. That is, in case where the electric field F1 is generated, color of all screen of the liquid crystal must show white color. However, in the minor axis the screen color shows yellow and in the major axis the screen color is blue, thereby degrading picture quality of the LCD.

For improving the above mentioned defect, Hitachi Research had suggested a LCD with a bended pixel electrode and a bended counter electrode in Euro Display 96, in the title of "complete suppression of color shift in-plane switching mode LCDs with a multidomain structure obtained by undirectional rubbing", which is illustrated in FIGS. 2A and 2B. A data line 1 is in a form of a straight line. A pixel electrode 2a has a U-shaped bended form. A counter electrode 3a is an inverse U-shaped bended form and interdigitated with respect to the pixel electrode 2a. If voltage is applied, an electric field F2 is formed between the pixel electrode 2a and the counter electrode 3a. Since both the pixel electrode and the counter electrode are bended, director of the liquid crystal molecules is different in upper portion and lower portion centering around the bending line of the pixel electrode and the counter electrode. That is, multidomain is formed, so the color shift is suppressed.

However, since the data line is straight while the pixel electrode and the counter electrode are bended, there is formed a space H between the pixel electrode 2a and the data line 1. In the space H between the pixel electrode and the data line, is generated a parasitic electric field. For blocking the parasitic electric field, a black matrix 10 is located on a upper substrate as shown in FIG. 2B. The black matrix 10 reduces an aperture ratio of the LCD, so the power consumption is increased for obtaining a normal luminance.

SUMMARY OF THE INVENTION

Accordingly, the present invention is to increase an aperture ratio of a liquid crystal display while suppressing a color shift.

In order to accomplish an aim of the present invention, a data line, a pixel electrode and a counter electrode all are bended in same direction and arranged parallel to each other.

In detail, a liquid crystal display has a lower substrate, a data line bended and formed on the lower substrate, a counter electrode bended in the same direction as the data line and formed on the lower substrate, and a pixel electrode bended in the same direction as the data line and formed on the lower substrate. The pixel electrode has a bar for bisecting a space defined by the counter electrode. The counter electrode is a rectangular frame.

Also, the liquid crystal display comprises a gate line intersecting the data line and arranged in a direction vertical to an extension of the data line. The pixel electrode further comprises a portion arranged parallel to the gate line, overlapping a portion of the counter electrode and connected to the bar.

Further, the liquid crystal display includes a upper substrate, and a black matrix bended in the same direction of the data line. The black matrix is formed on a portion of the upper substrate, the portion corresponding to the counter electrode and the data line.

Accordingly, an aperture ratio of the liquid crystal disciple is increased while multidomain is formed between the pixel electrode and the counter electrode.

BRIEF DESCRIPTION OF THE ATTACHED DRAWINGS

DESCRIPTION OF THE PRESENT INVENTION

Figure 1:
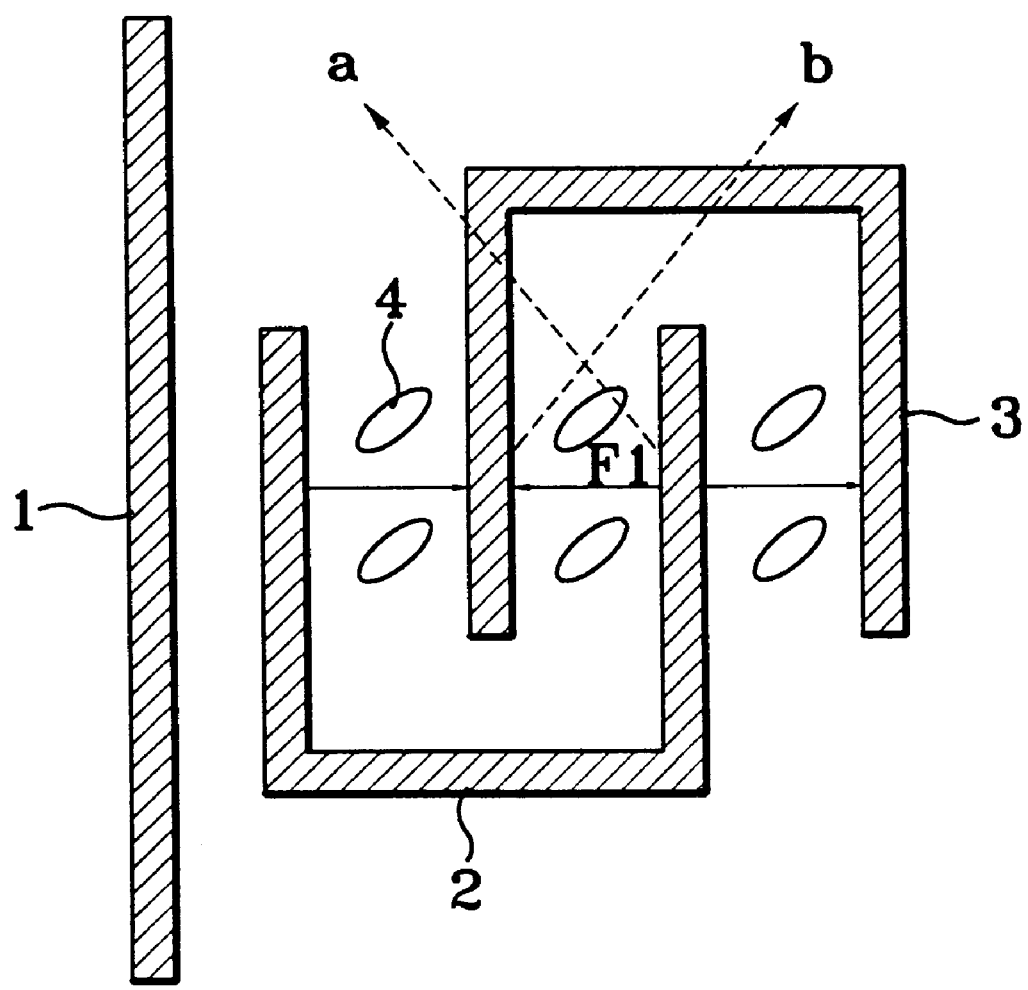
FIG. 1 is a view showing a plane of a conventional in-plane switching mode liquid crystal display.
Figure 2A:
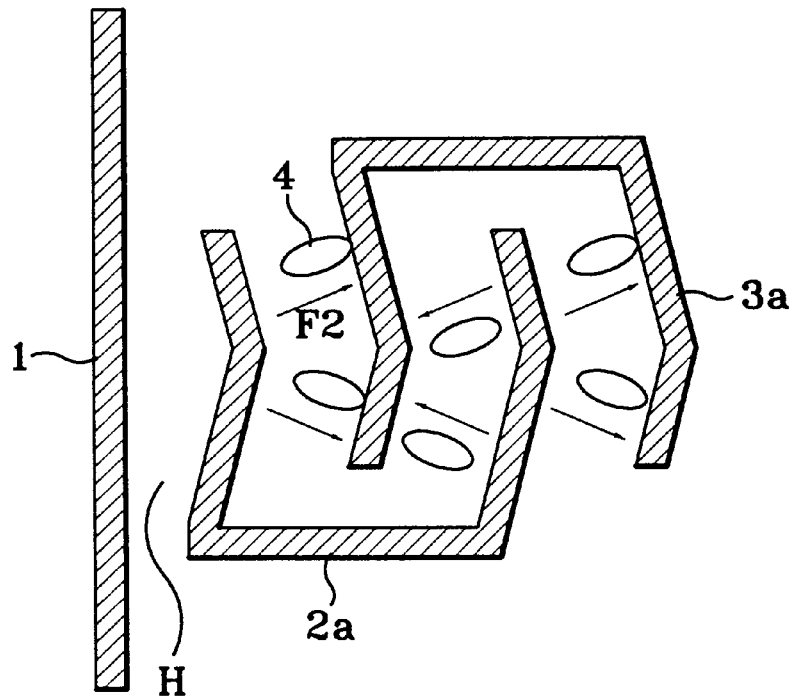
FIGS. 2A and 2B illustrate planes of another conventional in-plane switching mode liquid crystal display having a bended pixel electrode and a bended counter electrode.
Figure 2B:
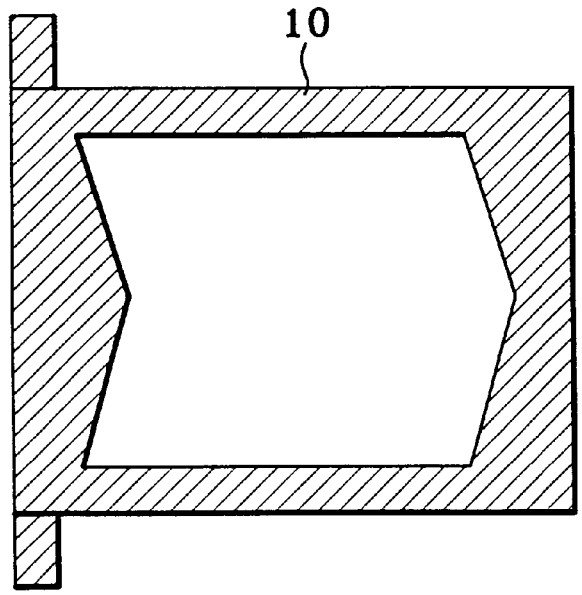
Figure 3A:
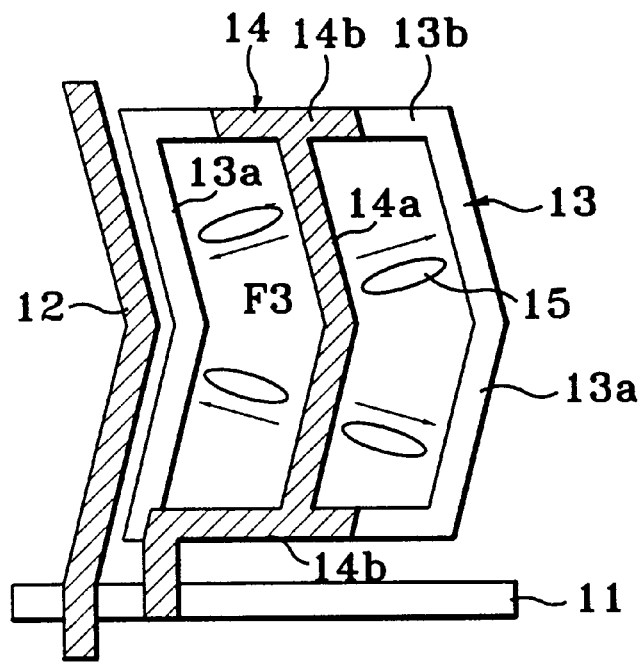
FIGS. 3A and 3B illustrate planes of a in-plane switching mode liquid crystal display according to the present invention.
Figure 3B:
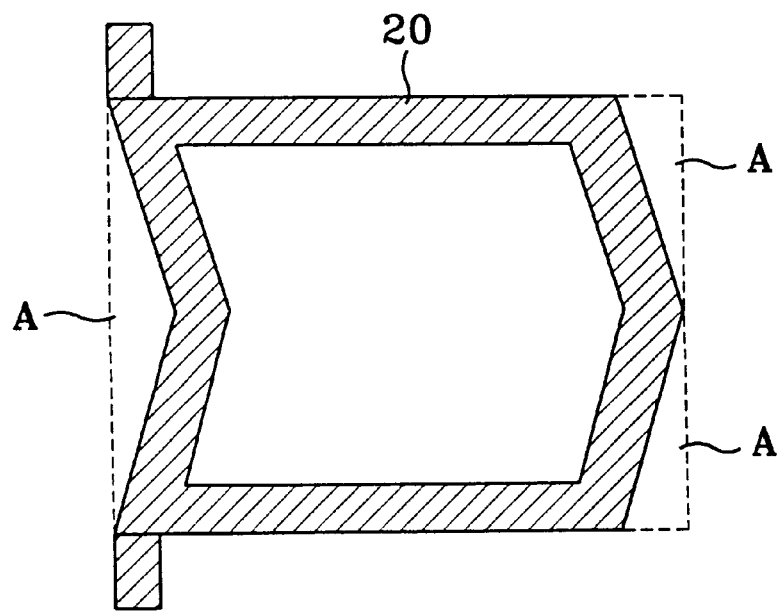

FIG. 3A shows a lower substrate of a liquid crystal display and FIG. 3B shows a upper substrate of a liquid crystal display. Numeral 11 represents a gate line, numeral 12 indicates a data line intersecting the gate line 11, numeral 13 is a counter electrode formed on the same plane as the gate line 11, numeral 14 stands for a pixel electrode overlapped with the counter electrode in some part and numeral 15 is liquid crystal molecules.

The gate line 11 is just straight extended in a first direction and the data line 12 is bended and extended in a second direction substantially perpendicular to the first direction. The gate line vertically intersects the data line. At a space defined by the gate line and the data line, is positioned a counter electrode in a rectangular frame. The counter electrode 13 has two opposite sides 13a bended in the same direction as the data line and another two opposite sides 13b extending parallel to the gate line between the former two sides 13a. The pixel electrode 14 includes a bar 14a bended in the same direction as the counter electrode, bisecting a space surrounded by the counter electrode 13 and a overlapping portion 14b connected to the bar 14a, extended parallel to the gate line 11 and overlapping the counter electrode 13. The overlapping portion 14b is contacted with the gate line through a given connection line.

The data line 12 is bended in the same direction as the counter electrode 14 and the pixel electrode 13. Accordingly, if voltage is applied to the LCD of FIG. 3A, director of the liquid crystal molecules is different in upper portion and in lower portion centering around the bending lines of the pixel electrode and the counter electrode. That is, multidomain is produced, so the color shift is suppressed. Also, since the pixel electrode is positioned remote from the data line and instead data line is arranged near the data line, there is no parasitic electric field between the pixel electrode and the data line and if any, it can be ignored. Thus, as shown in FIG. 3B, a black matrix 20 is bended in the same direction as the data line and is not formed in an area A. That is, an aperture ratio of the LCD is increased by the area A and then the increase of power consumption is prevented. On the other hand, since the counter electrode and the pixel electrode are not interdigitated each other but overlapped with each other in some region, an area occupied by the counter electrode and the pixel electrode can be minimized.

What is claimed is:

1. A liquid crystal display comprising:

a lower substrate;

a data line bended and formed on said lower substrate;

a counter electrode bended in the same direction as said data line and formed on said lower substrate, said counter electrode being a rectangular frame; and a pixel electrode bended in the same direction as said data line and formed on said lower substrate, said pixel electrode having a bar for bisecting a space defined by said counter electrode.

2. The liquid crystal display as claimed in claim 1, further comprising a gate line intersecting said data line and arranged in a direction vertical to an extension of said data line and wherein said pixel electrode further comprises a portion arranged parallel to said gate line, overlapping a portion of said counter electrode and connected to said bar.

3. The liquid crystal display as claimed in claim 1, further comprising: a upper substrate; and a black matrix bended in the same direction of said data line, said black matrix formed on a portion of said upper substrate, said portion corresponding to said counter electrode and said data line.

* * * * *